United States Patent
Kwon et al.

(10) Patent No.: US 12,536,677 B2
(45) Date of Patent: Jan. 27, 2026

(54) METHOD AND APPARATUS FOR OBTAINING FIRST AND SECOND IMAGES TO DETECT FIRST AND SECOND LANDMARKS AND FACE REGISTRATION USING 3D FACIAL LANDMARK

(71) Applicant: KWANGWOON UNIVERSITY INDUSTRY-ACADEMIC COLLABORATION FOUNDATION, Seoul (KR)

(72) Inventors: Soonchul Kwon, Seoul (KR); Seunghyun Lee, Seoul (KR); Hoijun Kim, Seoul (KR); Jaeseung Kim, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 292 days.

(21) Appl. No.: 18/361,744

(22) Filed: Jul. 28, 2023

(65) Prior Publication Data

US 2024/0046492 A1    Feb. 8, 2024

(30) Foreign Application Priority Data

Aug. 2, 2022 (KR) ......................... 10-2022-0096248

(51) Int. Cl.
*G06T 7/33* (2017.01)
*G06T 7/246* (2017.01)
(Continued)

(52) U.S. Cl.
CPC .............. *G06T 7/337* (2017.01); *G06T 7/248* (2017.01); *G06V 10/7515* (2022.01);
(Continued)

(58) Field of Classification Search
None
See application file for complete search history.

(56) References Cited

U.S. PATENT DOCUMENTS

| 11,055,889 B2* | 7/2021 | Lee ...................... G06V 40/176 |
| 2022/0139107 A1* | 5/2022 | Cheng .................. G06V 40/165 |
| | | 382/181 |

(Continued)

FOREIGN PATENT DOCUMENTS

| KR | 10-2009-0092473 A | 9/2009 |
| KR | 10-2017-0000748 A | 1/2017 |
| KR | 10-2021-0156796 A | 12/2021 |

OTHER PUBLICATIONS

Office Action for KR 10-2022-0096248 by Korean Intellectual Property Office dated May 14, 2025.
(Continued)

*Primary Examiner* — Haris Sabah
(74) *Attorney, Agent, or Firm* — BROADVIEW IP LAW, PC

(57) ABSTRACT

Provided is a face registration method performed by a face registration apparatus, the face registration method including obtaining first face image data and second face image data that are captured at different angles, sizes, or locations, detecting a first landmark for the first face image data and a second landmark for the second face image data, calculating the amount of movement and distance between the first and second landmarks and setting a plurality of reference landmarks on the basis of the amount of movement and the distance, and matching the first and second landmarks with each other by adjusting a position, angle, and size on the basis of the plurality of reference landmarks.

10 Claims, 7 Drawing Sheets

(51) Int. Cl.
  *G06V 10/75* (2022.01)
  *G06V 40/16* (2022.01)
  *G06V 10/80* (2022.01)
  *G06V 40/18* (2022.01)

(52) U.S. Cl.
  CPC .......... *G06V 40/161* (2022.01); *G06V 10/803* (2022.01); *G06V 40/16* (2022.01); *G06V 40/197* (2022.01)

(56) References Cited

U.S. PATENT DOCUMENTS

2022/0301166 A1* 9/2022 Li .......................... G06T 7/0014
2022/0398795 A1* 12/2022 Phan ..................... G06V 10/82

OTHER PUBLICATIONS

Sun, Jian et al., "A Concise and Provably Informative Multi-Scale Signature Based on Heat Diffusion", Computer Graphics Forum: vol. 28, Issue 5, Jul. 2009. doi: 10.1111/j.1467-8659.2009.01515.x.

* cited by examiner

METHOD AND APPARATUS FOR OBTAINING FIRST AND SECOND IMAGES TO DETECT FIRST AND SECOND LANDMARKS AND FACE REGISTRATION USING 3D FACIAL LANDMARK

CROSS-REFERENCE TO RELATED APPLICATION

This application claims priority to and the benefit of Korean Patent Application No. 10-2022-0096248, filed on Aug. 2, 2022, the disclosure of which is incorporated herein by reference in its entirety.

BACKGROUND

1. Field of the Invention

The present invention relates to a face registration technique, and more particularly, to a face registration method and apparatus for detecting three-dimensional (3D) facial landmarks in a plurality of pieces of face image data captured in different directions and performing face registration using the 3D facial landmarks.

2. Discussion of Related Art

Facial paralysis is a disease caused due to the malfunction of the nerves of the facial muscles, in which one side of the muscles of the perimeter of the mouth or the eyes is paralyzed, thus resulting in contortion of the face. When initial treatment for facial paralysis is not performed properly, serious aftereffects such as appearance discomfort, psychological anxiety or depression may occur and thus it is important to detect facial paralysis at an early stage.

A method of capturing face pictures and comparing them with each other may be used to determine whether the face of a patient with facial paralysis contorts or not. When the positions of feature points on the face in the facial pictures are compared and analyzed, the positions of the feature points can be compared relatively accurately when the face has been photographed at the same location, angle, and size of the face but cannot be compared accurately when the face is photographed while any one of the location, angle, and size is changed, thus resulting in an incorrect determination result. That is, it may be determined that facial paralysis has occurred even though the face does not contort due to facial paralysis when the face is photographed at a different location, angle or size. However, there are restrictions on conditions under which a patient's face can be photographed under all the same conditions every time the face is photographed, and thus there is a need to process captured images regardless of shooting conditions and an environment to accurately diagnose facial paralysis.

RELATED ART DOCUMENT

Patent Document (Patent Document 1) Korean Publication No.10-2021-0156796

SUMMARY OF THE INVENTION

The present invention is directed to providing a face registration method and apparatus for detecting three-dimensional (3D) facial landmarks from two-dimensional (2D) RGB face image data and matching pieces of face image data captured at different angles, sizes, or positions using the 3D facial landmarks.

The present invention is directed to providing a face registration method and apparatus for performing face registration by setting reference landmarks serving as reference points from among 3D facial landmarks and adjusting a position, angle, and size with respect to the reference landmarks.

The present invention is directed to providing a face registration method and apparatus for visualizing the amount of movement between landmarks of a plurality of pieces of face image data.

Aspects of the present invention are not limited thereto and other aspects that are not described here will be clearly understood by those of ordinary skill in the art from the following description.

A first aspect of the present invention includes a face registration method performed by a face registration apparatus, the face registration method including (a) obtaining first face image data and second face image data that are captured at different angles, sizes, or locations, (b) detecting a first landmark for the first face image data and a second landmark for the second face image data, (c) calculating the amount of movement and distance between the first and second landmarks and setting a plurality of reference landmarks on the basis of the amount of movement and the distance, and (d) matching the first and second landmarks with each other by adjusting a position, angle, and size on the basis of the plurality of reference landmarks.

Preferably, (b) may include detecting the first landmark for the first face image data and the second landmark for the second face image data by applying a deep learning algorithm to the first face image data and the second face image data, in which the deep learning algorithm may correspond to an high-resolution network (HR-net), a convolutional neural network and conditional random field (CNN-CRF), or Mediapipe, the first and second landmarks may each include a plurality of facial landmarks and a plurality of eye landmarks and be managed by assigning a series of numbers thereto, and the same number may be assigned to a landmark corresponding to both the first and second landmarks.

Preferably, (c) may include dividing the first and second landmarks into an upper part and a lower part, and dividing the upper part into an upper side, a lower side, a right side, and a left side, calculating an amount of movement corresponding to a distance between a pair of corresponding landmarks on the upper part of the first and second landmarks in a three-dimensional (3D) space, and selecting a plurality of landmarks from each of the upper, lower, right and left sides of the upper part of the first and second landmarks, starting from a smallest amount of movement.

Preferably, (c) may include calculating a distance between landmarks included on the upper and lower sides of each of the first and second landmarks and a distance between landmarks included on the right and left sides of each of the first and second landmarks among the plurality of landmarks selected from among the first and second landmarks on the basis of the amount of movement, and determining a first reference landmark for the first landmark and a second reference landmark for the second landmark by setting, as an upper reference landmark and a lower reference landmark, a pair of landmarks spaced a largest distance from each other among the landmarks included on the upper side and the landmarks included on the lower side and setting, as a right reference landmark and a left reference landmark, a pair of landmarks spaced a largest distance from each other among the landmarks included on the right side and the landmarks included on the left side.

Preferably, (d) may include moving coordinates of one of the reference landmarks among the first and second reference landmarks to coordinates of an origin, and adjusting positions of the first and second landmarks by moving coordinates of the first landmark by an amount of movement of the coordinates of the first reference landmark to the coordinates of the origin and moving coordinates of the second landmark by an amount of movement of the coordinates of the second reference landmark to the coordinates of the origin.

Preferably, (d) may further include generating a first connection line connecting the right and left reference landmarks for each of the first and second reference landmarks, and generating a second connection line by vertically connecting a center of the first connection line and the upper reference landmark, calculating an angle between the first and second connection lines and each axis of the 3D space, and adjusting angles of the first and second landmarks by rotating the first and second landmarks about each axis on each plane through transformation of Euler angles on the basis of the calculated angle.

Preferably, (d) may further include calculating a width and height of each of the first and second reference landmarks corresponding to a distance between the right and left reference landmarks and a distance between the upper and lower reference landmarks for each of the first and second reference landmarks, and adjusting a size of the second landmark according to a size of the first landmark on the basis of a ratio between the width of the first reference landmark and the width of the second reference landmark and a ratio between the height of the first reference landmark and the height of the second reference landmark.

Preferably, the face registration method may further include visualizing the first and second landmarks by setting colors thereof using a heat map based on a distance between a pair of corresponding landmarks in the first and second landmarks in a three-dimensional (3D) space before or after the matching of the first and second landmarks.

A second aspect of the present invention includes a face registration apparatus including an image data obtainer configured to obtain first face image data and second face image data that are captured at different angles, sizes, or locations, a landmark detector configured to detect a first landmark for the first face image data and a second landmark for the second face image data, a reference landmark setter configured to calculate an amount of movement and distance between the first and second landmarks and set a plurality of reference landmarks on the basis of the amount of movement and the distance, and a landmark matching part configured to match the first and second landmarks with each other by adjusting a position, angle, and size on the basis of the plurality of reference landmarks.

A third aspect of the present invention provides a computer program stored in a computer-readable medium, in which a data matching method is performed when instructions of the computer program are executed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
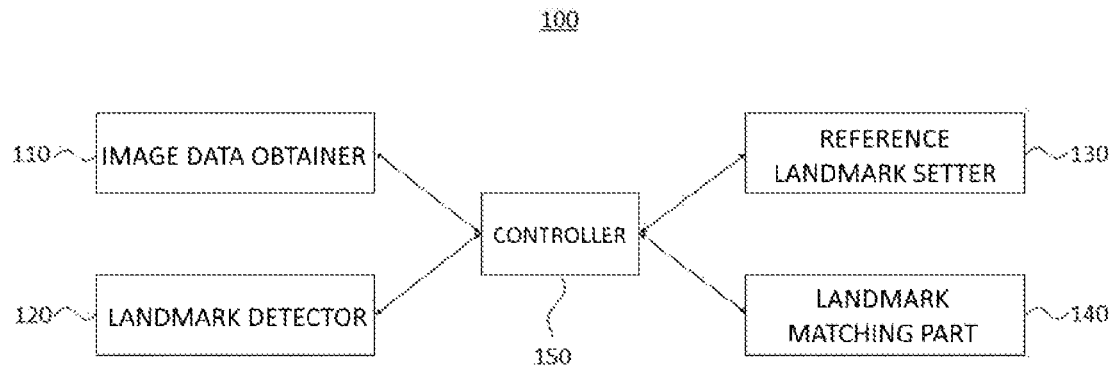
FIG. 1 is a block diagram of a face registration apparatus according to an embodiment of the present invention.

Advantages and features of the present invention and methods of achieving them will be apparent from embodiments described below in conjunction with the accompanying drawings. However, the present invention is not limited to the embodiments set forth herein and may be embodied in many different forms. The embodiments are merely provided so that this disclosure will be thorough and complete and will fully convey the scope of the present invention to those of ordinary skill in the art. The present invention should be defined by the scope of claims. The same reference numerals refer to the same components throughout the specification. The term "and/or" should be understood to include each of stated items and all combinations of one or more of the items.

It should be understood that although terms such as "first," "second," and the like are used herein to describe various elements, components, and/or sections, the elements, components, and/or sections are not limited by these terms. These terms are only used to distinguish one element, component, or section from another element, component, or section. Therefore, a first element, a first component, or a first section described below may be termed as a second element, a second component, or a second section within the technical spirit of the present invention.

In operations, identification signs (e.g., a, b, etc.) are used for convenience of description and are not intended to describe an order of the operations, and the operations may be performed differently from an order specified herein unless the context clearly indicates the order. That is, the operations may be performed in the specified order, performed substantially simultaneously or performed in an order opposite to the specified order.

The terminology used herein is for the purpose of describing embodiments only and is not intended to be limiting of the present invention. As used herein, singular forms are intended to include plural forms unless the context clearly indicates otherwise. As used herein, the terms "comprise" and/or "comprising" specify the presence of stated components, steps, operations and/or elements but do not preclude the presence or addition of one or more other components, steps, operations and/or elements.

Unless defined otherwise, all the terms (including technical and scientific terms) used herein have the same meaning as commonly understood by those of ordinary skill in the art to which the present invention pertains. Terms defined in a generally used dictionary should not be ideally or excessively interpreted unless clearly and specifically defined herein.

In the following description of embodiments of the present invention, well-known functions or constructions are not described in detail when it is determined that they would obscure the subject matter of the present invention due to unnecessary detail. In addition, terms to be described below are defined in consideration of functions in embodiments of the present invention and thus may be changed according to an intention of a user or operator, practices or the like. Therefore, these terms should be defined based on the whole context of the present specification.

FIG. 1 is a block diagram of a face registration apparatus according to an embodiment of the present invention.

Referring to FIG. 1, a face registration apparatus 100 includes an image data obtainer 110, a landmark detector 120, a reference landmark setter 130, a landmark matching part 140, and a controller 150. Here, the controller 150 controls the operations of the image data obtainer 110, the landmark detector 120, the reference landmark setter 130, and the landmark matching part 140, and the flow of data.

The face registration apparatus 100 is an apparatus for performing face registration by obtaining a plurality of pieces of face image data. Preferably, in the face registration apparatus 100, an application or a program that performs a face registration method may be installed and executed by a computer, and a user interface may be included to control the input or output of data. Here, the computer may be understood as including all types of hardware devices including at least one processor, and may be understood as including a software configuration operating in a corresponding hardware device according to an embodiment. For example, the computer may be understood as including all of a smartphone, a tablet PC, a desktop computer, a laptop computer, and a user client and an application executed in each device but is not limited thereto.

The image data obtainer 110 obtains a plurality of pieces of face image data captured at different angles, sizes, or positions. Here, the face image data may be an RGB image obtained through a general photographing device. Preferably, the obtained face image data may be managed by being classified according to a photographing target or a photographing time, and a change in the face of a corresponding target over time may be analyzed on the basis of face image data stored in units of photographing targets.

The landmark detector 120 detects a landmark for each piece of face image data through a deep learning algorithm that detects a key point, i.e., a landmark (e.g., an eye, nose, mouth, eyebrow, or chin), which may be a feature of a face in face image data. Here, the landmark may be a three-dimensional (3D) facial landmark.

The reference landmark setter 130 sets a reference landmark for face registration among landmarks for the plurality of pieces of face image data. The plurality of pieces of face image data have been captured at different angles, sizes, or positions and thus a matching result may be incorrect when the landmarks therefor are used directly, and therefore, the reference landmark setter 130 sets the reference landmark for adjusting the different angles, sizes, or positions.

The landmark matching part 140 performs matching to align a plurality of pieces of face image data obtained from different coordinate systems to one coordinate system. Because the plurality of pieces of face image data obtained by the image data obtainer 110 have been captured at different angles, sizes, or positions, the landmark matching part 140 may preferably adjust the positions, angles, and sizes of the landmarks to align the plurality of pieces of face image data to a coordinate system through landmark matching of the plurality of pieces of face image data.

The operations performed through the components of the face registration apparatus 100 illustrated in FIG. 1 will be described in detail with reference to FIG. 2 below. Although it will be described with reference to FIG. 2 below that these operations are performed by different components, embodiments are not limited thereto, and at least some of the operations may be performed by the same component or different components according to an embodiment.

Figure 2:
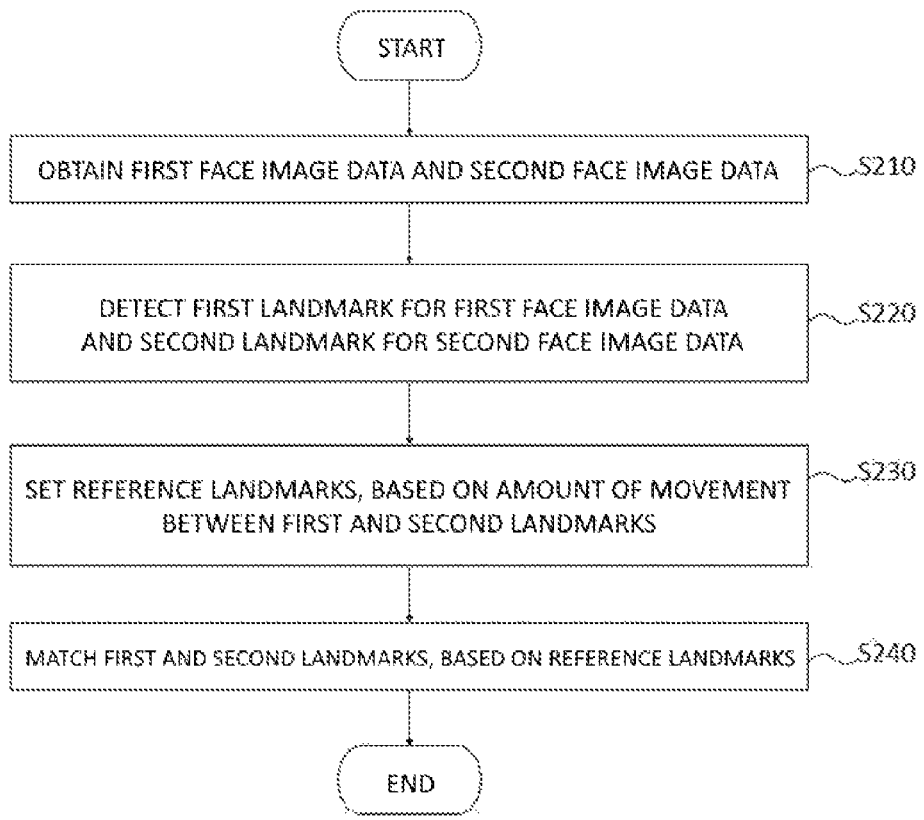
FIG. 2 is a flowchart of a face registration method according to an embodiment.

FIG. 2 is a flowchart of a face registration method according to an embodiment.

Referring to FIG. 2, the image data obtainer 110 obtains first face image data and second face image data (operation S210). Preferably, the image data obtainer 110 may obtain first face image data and second face image data that are captured at different angles, sizes, or positions. The image data obtainer 110 may obtain face image data stored in the face registration apparatus 100 or face image data stored and managed in a separate storage device or obtain face image data captured in real time according to an analysis purpose. For example, in order to analyze a degree of change in the face over time, the image data obtainer 110 may obtain first face image data and second face image data stored at a previous point in time or obtain the first face image data stored at the previous point in time and second face image data captured in real time.

The landmark detector 120 detects a first landmark and a second landmark for the first face image data and the second face image data (operation S220). Preferably, the landmark detector 120 may apply a deep learning algorithm corresponding to a high-resolution network (HR-net), a convolutional neural network and conditional random field (CNN-CRF), or Mediapipe to the first face image data and the second face image data to detect a first landmark for the first face image data and a second landmark for the second face image data. Both the first and second landmarks may be 3D facial landmarks, all networks that are capable of operating in real time may be applied to an algorithm for detection of landmarks, and a method of detecting a landmark using the HR-net, the CNN-CRF, or Mediapipe will be easily understood and performed by those of ordinary skill in the technical field to which the present invention pertains and thus a detailed description thereof is omitted herein.

Figure 3:
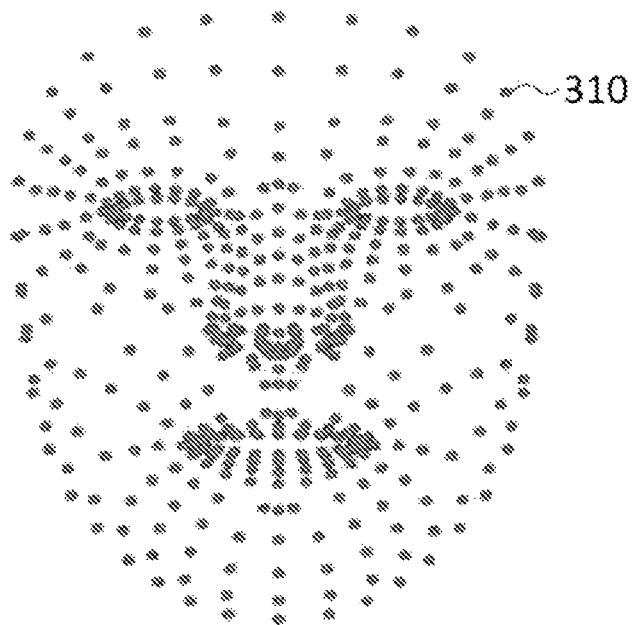
FIG. 3 is a diagram for describing a landmark according to an embodiment.

Preferably, the first and second landmarks may each include facial landmarks and eye landmarks, these landmarks may be managed by assigning a series of numbers thereto, and the same number may be assigned to a landmark corresponding to both the first and second landmarks. For example, the landmark detector 120 may extract landmarks by marking 478 3D points for each of the first face image data and the second face image data, the 478 3D points may consist of 468 facial landmarks and 10 eye landmarks, and a result of detecting the landmarks for the first face image data and the second face image data may be blue dots 310 shown in FIG. 3. For example, the first landmark may include $\{A0(A0,x, A0,y, A0,z), A1(A1,x, A1,y, A1,z), \ldots A467(A467,x, A467,y, A467,z)\}$, and the second landmark may include $\{B0(B0,x, B0,y, B0,z), \ldots B1(B1,x, B1,y, B1,z), B467(B467,x, B467,y, B467,z)\}$.

Figure 4:
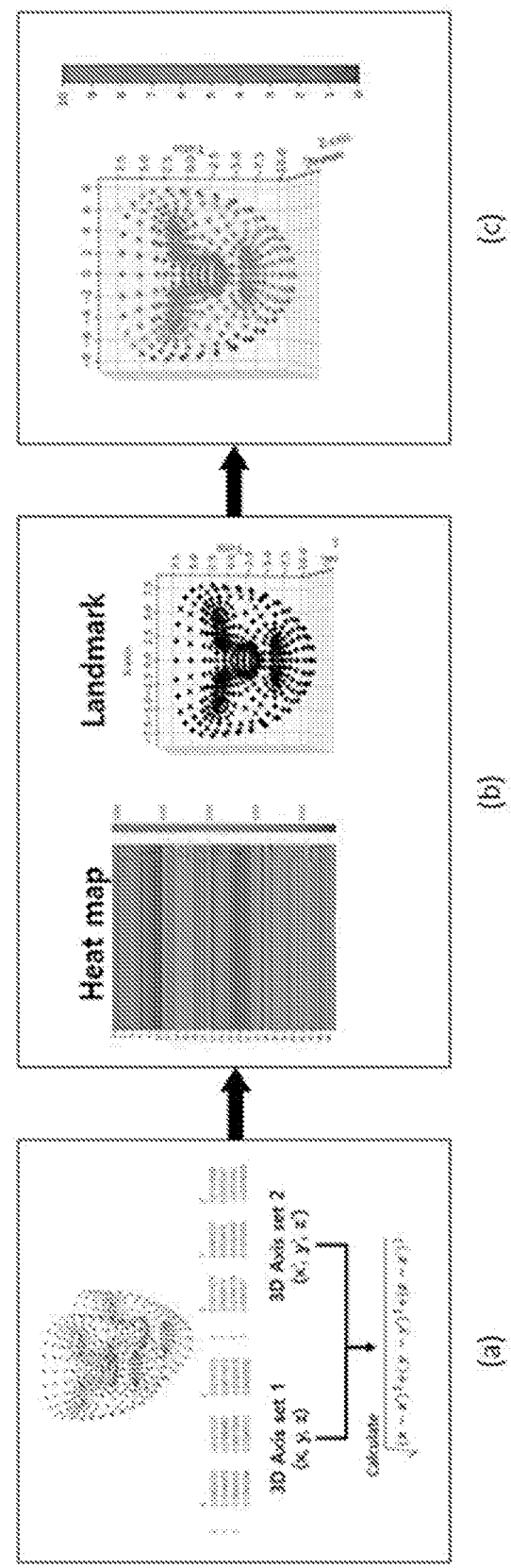
FIG. 4 is a diagram for describing visualization of the amount of movement of a landmark according to an embodiment.

The reference landmark setter 130 sets a reference landmark on the basis of the amount of movement between the first and second landmarks (operation S230). First, the reference landmark setter 130 may calculate the amount of movement between the first and second landmarks. Preferably, the reference landmark setter 130 may calculate the amount of movement corresponding to the distance between a pair of corresponding landmarks, i.e., landmarks assigned the same number, on the first and second landmarks in a 3D space. For example, referring to FIG. 4, when the first and second landmarks are detected as shown in FIG. 4A, the amount of movement may be calculated by calculating a Euclidean distance between coordinates (x,y,z) and (x',y',z') of corresponding landmarks, and the amount of movement may be calculated for all corresponding landmarks on the first and second landmarks. The amount of movement between A0 and B0, the amount of movement between A1 and B1, . . . , and the amount of movement between A467 and B467 are calculated.

In an embodiment, the face registration apparatus 100 may further include a landmark visualization part (not shown), and the landmark visualization part may visualize landmarks by setting colors of the landmarks using a heat map based on the amount of movement between the first and second landmarks. The heat map is a tool that visualizes effects of various categories for numerical values, and the representation of the amount of movement of landmarks using colors through the heat map can be easily performed by those of ordinary skill in the technical field to which the present invention pertains. For example, referring to FIG. 4, when the heat map is applied to landmarks (see FIG. 4B) on the basis of a calculated amount of movement of each landmark (see FIG. 4A), landmarks with large amounts of movement may be visualized in a color similar to red, and landmarks with small amounts of movement may be visualized in a color similar to blue as shown in FIG. 4C.

The reference landmark setter 130 may set a plurality of reference landmarks on the basis of the amount of movement of each landmark and the distance between landmarks, and preferably, landmarks with small amounts of movement that are spaced a large distance from each other among landmarks of the first and second landmarks may be set as a first reference landmark and a second reference landmark.

More specifically, the reference landmark setter 130 divides landmarks near contours among upper landmarks from the eyes to the forehead into upper landmarks corresponding to the forehead, lower landmarks corresponding to the eyes, and right and left landmarks corresponding to the temples, and selects a predetermined number of landmarks from among the upper, lower, right and left landmarks, starting from the landmark with the smallest amount of movement. Here, a range of the contours for setting reference landmarks may be preset by a user. Alternatively, embodiments are not limited to contours, and the reference landmark setter 130 may divide the upper landmarks into upper, lower, right and left landmarks and select landmarks from among the upper, lower, right and left landmarks, starting from the landmark with the smallest amount of movement. Preferably, the reference landmark setter 130 calculates the distance between upper and lower landmarks and the distance between right and left landmarks among landmarks selected on the basis of the amounts of movement. For example, the reference landmark setter 130 may calculate the distances between landmarks a and ], landmarks a and L, landmarks b and ], and landmarks b and L among the upper landmarks a and b and the lower landmarks ] and L, and the distances between landmarks c and ⊏, landmarks c and ⊒, landmarks d and ⊏, and landmarks d and ⊒ among the right landmarks c and d and the left landmarks ⊏ and ⊒.

Next, the reference landmark setter 130 may set an upper reference landmark, a lower reference landmark, a right reference landmark, and a left reference landmark on the basis of the calculated distances and the amounts of movement. For example, a distant landmark among landmarks selected on the basis of the amounts of movement may be selected as a reference landmark, and when the distance between the landmarks a and ] is greatest among the distances between the landmarks a and ], the landmarks a and L, the landmarks b and ], and the landmarks b and L and the distance between the landmarks d and ⊏ is greatest among the distances between the landmarks c and ⊏, the landmarks c and ⊒, the landmarks d and ⊏, and the landmarks d and ⊒, the reference landmark setter 130 may set the landmark a, the landmark ], the landmark d, and he landmark ⊏ as an upper reference landmark, a lower reference landmark, a right reference landmark, and a left reference landmark.

Figure 5:
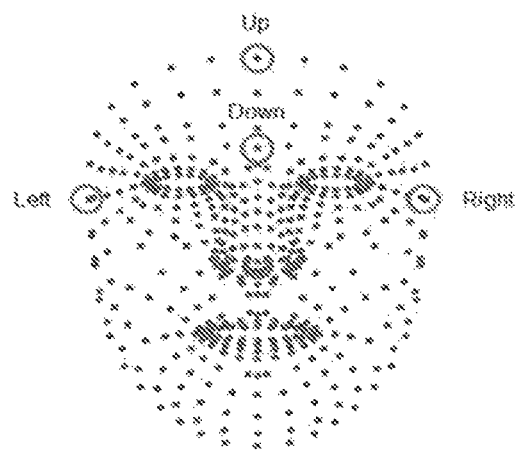
FIG. 5 is a diagram for describing a reference landmark according to an embodiment.

Here, the upper part of the face is a part that is not likely to change to a large degree and thus may not change to a large degree even when facial paralysis occurs, and therefore the reference landmark setter 130 sets a reference landmark among the landmarks near the contour of the upper part. The reference landmark may be a distant landmark with a small amount of movement, and a method of setting a reference landmark on the basis of the amount of movement and a distance may include, but is not limited to, a method of setting a reference landmark on the basis of a value calculated by adding weights to the amount of movement and a distance or a method of setting a most distant landmark as a reference landmark among a certain number of selected landmarks, starting from a landmark with a small amount of movement. That is, various modifications may be made in the method of setting a reference landmark on the basis of the amount of movement and a distance. For example, referring to FIG. 5, the reference landmark setter 130 may set an upper end landmark Up on the forehead as an upper reference landmark, a landmark Down on a middle of the forehead as a lower reference landmark, a right end landmark Right on the face as a right reference landmark, and a left end landmark Left on the face as a left reference landmark.

The landmark matching part 140 matches the first and second landmarks with each other on the basis of the reference landmark (operation S240). Preferably, the landmark matching part 140 may match the first and second landmarks with each other through position adjustment, angle adjustment, and size adjustment on the basis of a plurality of reference landmarks.

Figure 6:
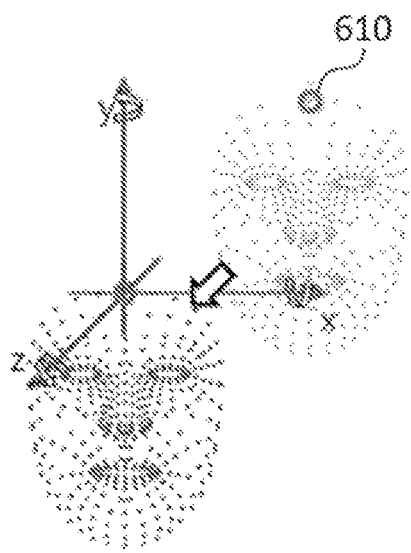
FIG. 6 is a diagram for describing position adjustment in a landmark matching process according to an embodiment.

More specifically, the landmark matching part 140 moves the coordinates of a reference landmark on the first reference landmark to coordinates of an origin, and moves the coordinates of a reference landmark on the second reference landmark corresponding to the reference landmark of the first reference landmark moved to the coordinates of the origin to the coordinates of the origin. Next, the landmark matching part 140 may adjust positions of the first and second landmarks by moving coordinates of the first reference landmark by the amount of movement of the reference landmark of the first reference landmark to the coordinates of the origin and moving coordinates of the second reference landmark by the amount of movement of the reference landmark of the second reference landmark to the coordinates of the origin. For example, referring to FIG. 6, when coordinates of an upper reference landmark 610 are (x,y,z), the landmark matching part 140 may move the coordinates of the upper reference landmark 610 to an origin (0,0,0), and move a landmark by subtracting the coordinates (x,y,z) of the upper reference landmark 610 from coordinates of another landmark. When the upper reference landmark 610 on the first reference landmark is moved to the coordinates (x,y,z), coordinates of other landmarks on the first landmark are moved from A0(A0,x, A0,y, A0,z) to A0(A0,x-x, A0,y-y, A0,z-z) and A1(A1,x, A1,y, A1,z) to A1(A1,x-x, A1,y-y, A1,z-z), and such movement also applies to the movement of an upper reference landmark on the second reference landmark to the origin with respect to the second landmark.

Figure 7:
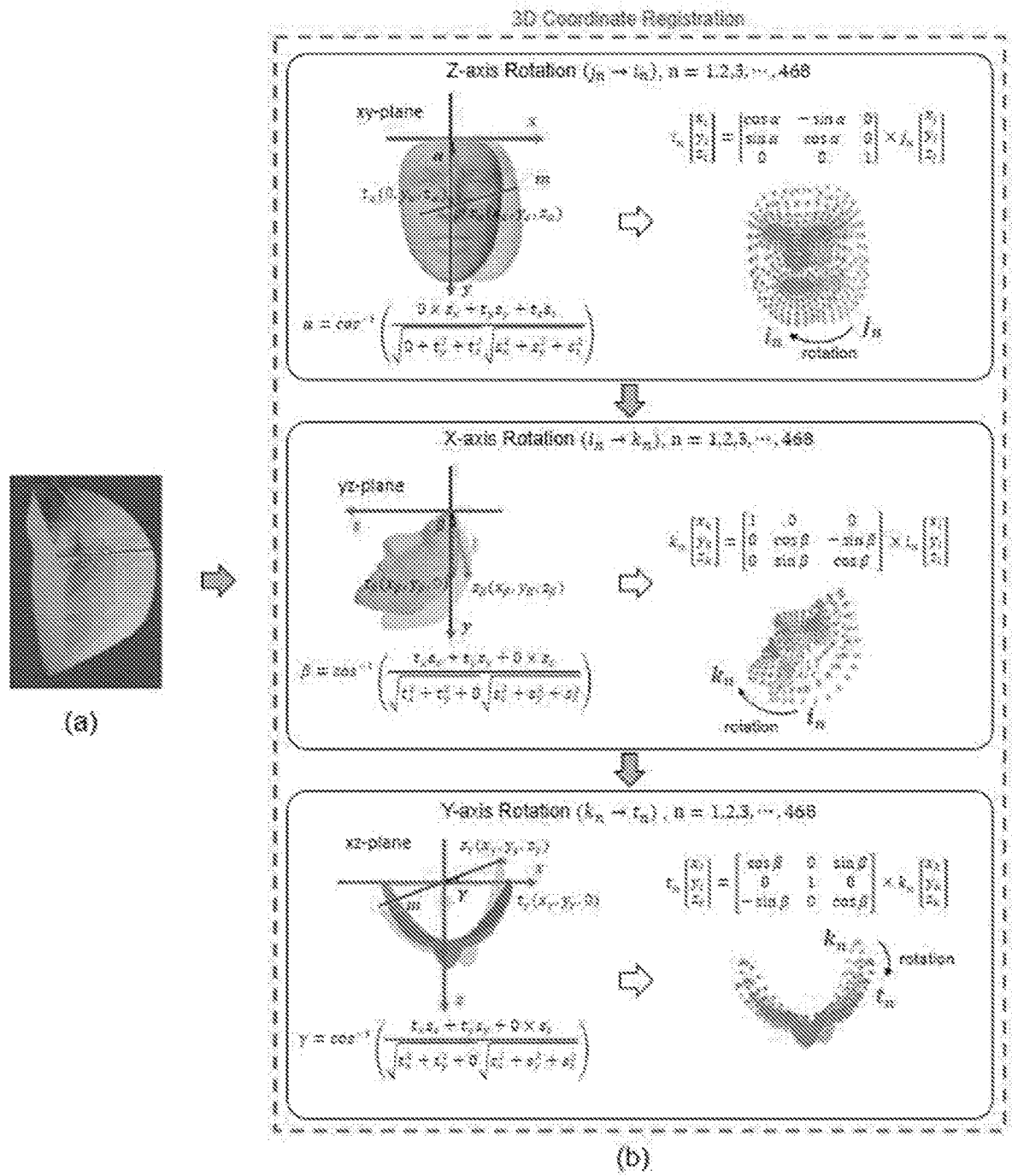
FIG. 7 is a diagram for describing angle adjustment in a landmark matching process according to an embodiment.

Preferably, the landmark matching part 140 may generate a first connection line connecting right and left reference landmarks for each of the first and second reference landmarks, and generate a second connection line by vertically connecting a center of the first connection line and an upper reference landmark. For example, referring to FIG. 7A, the landmark matching part 140 may generate a first connection line m on the basis of right and left reference landmarks, and generate a second connection line l using the first connection line m and an upper reference landmark.

Next, the landmark matching part 140 may calculate an angle between the first and second connection lines m and l and each axis of a 3D space, and rotate the first and second landmarks about each axis on each plane through transformation of Euler angles on the basis of the calculated angle to adjust angles of the first and second landmarks. Here, the Euler angles are three angles for displaying an orientation of an object in a 3D space, and the transformation of the Euler angles will be easily performed by those of ordinary skill in the technical field to which the present invention pertains and thus a detailed description thereof is omitted here. For example, referring to a first diagram of FIG. 7B, the landmark matching part 140 may perform the transformation of the Euler angles on the basis of an angle α of T(0,y,z) between an intersection S(x,y,z) of the first and second connection lines m and l and a z-axis to rotate the first and second landmarks about the z-axis on an xy plane, thereby performing 3D coordinate rotation on jn(xj,yj,zj) to obtain in(xi,yi,zi). Referring to a second diagram of FIG. 7B, the landmark matching part 140 may perform the transformation of the Euler angles on the basis of an angle β of (x,y,0) between the intersection S(x,y,z) of the first and second connection lines m and l and an x-axis to rotate the first and second landmarks about the x-axis on the xy plane, thereby performing 3D coordinate rotation on in(xi,yi,zi) to obtain kn(xk,yk,zk). Referring to a third diagram of FIG. 7B, the landmark matching part 140 may perform the transformation of the Euler angles on the basis of an angle γ of (x,y,0) between the intersection S(x,y,z) of the first and second connection lines m and l and a y-axis to rotate the first and second landmarks about the y-axis on the xy plane, thereby performing 3D coordinate rotation on kn(xk,yk,zk) to obtain tn(xt,yt,zt). In this way, the angles of the first and second landmarks may be adjusted.

Figure 8:
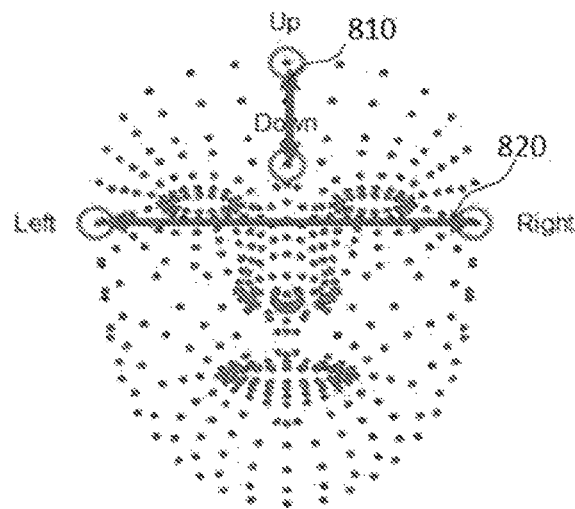
FIGS. 8 and 9 are diagrams for describing size adjustment in a landmark matching process according to an embodiment.

Preferably, the landmark matching part 140 may adjust the size of the first and second landmarks by setting the width and height ratio of the first and second face image data according to the ratio of the distance between the right and left reference landmarks and the distance between the top and bottom. For example, referring to FIG. 8, the landmark matching part 140 may calculate a distance 810 between an upper reference landmark Up and a lower reference landmark Down and a distance 820 between a right reference landmark Right and a left reference landmark Left on a first reference landmark, calculate a ratio between a width and a height of a second reference landmark in a similar manner, and adjust a scale of a second landmark according to a width and a height of a first landmark, based on a ratio between a width of the first reference landmark and the width of the second reference landmark and a ratio between a height of the first reference landmark and the height of the second reference landmark.

Figure 9:
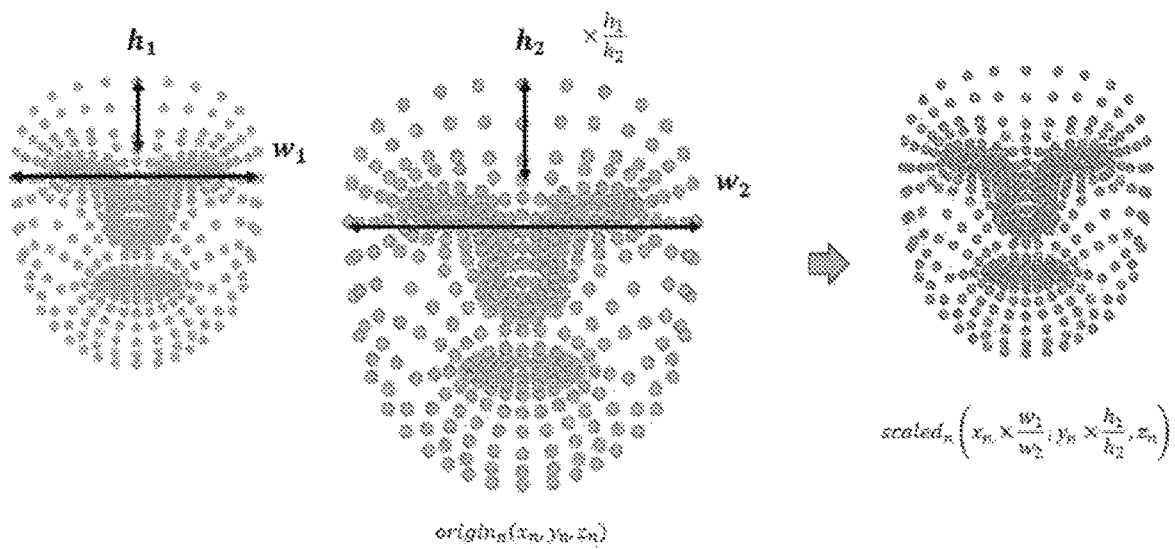

More specifically, referring to FIG. 9, the landmark matching part 140 may calculate a width w1, which is the distance between left and right reference landmarks, and a height h1, which is the distance between upper and lower reference landmarks, of a first reference landmark by [Equation 1] below.

$$w1 = abs(left1 - right1), \; h1 = abs(up1 - down1) \quad \text{[Equation 1]}$$

Here, left1, right1, up1, and down1 denote the left reference landmark, the right reference landmark, the upper reference landmark, and the lower reference landmark of the first landmark, respectively. Similarly, a width w2 and a height h2 of a second reference landmark may be calculated by [Equation 2] below.

$$w2 = abs(left2 \; right2), \; h2 = abs(up2 \; down2) \quad \text{[Equation 2]}$$

Here, left2, right2, up2, and down2 denote a left reference landmark, a right reference landmark, an upper reference landmark, and a lower reference landmark of the second landmark, respectively.

Next, the landmark matching part 140 may adjust the width of a second landmark by multiplying an x-axis coordinate of the second landmark by (w1/w2) and the height of the second landmark by multiplying a y-axis coordinate of the second landmark by (h1/h2) to adjust the width w2 and the height h2 of the second reference landmark according to the width w1 and the height h1 of the first reference landmark.

Figure 10:
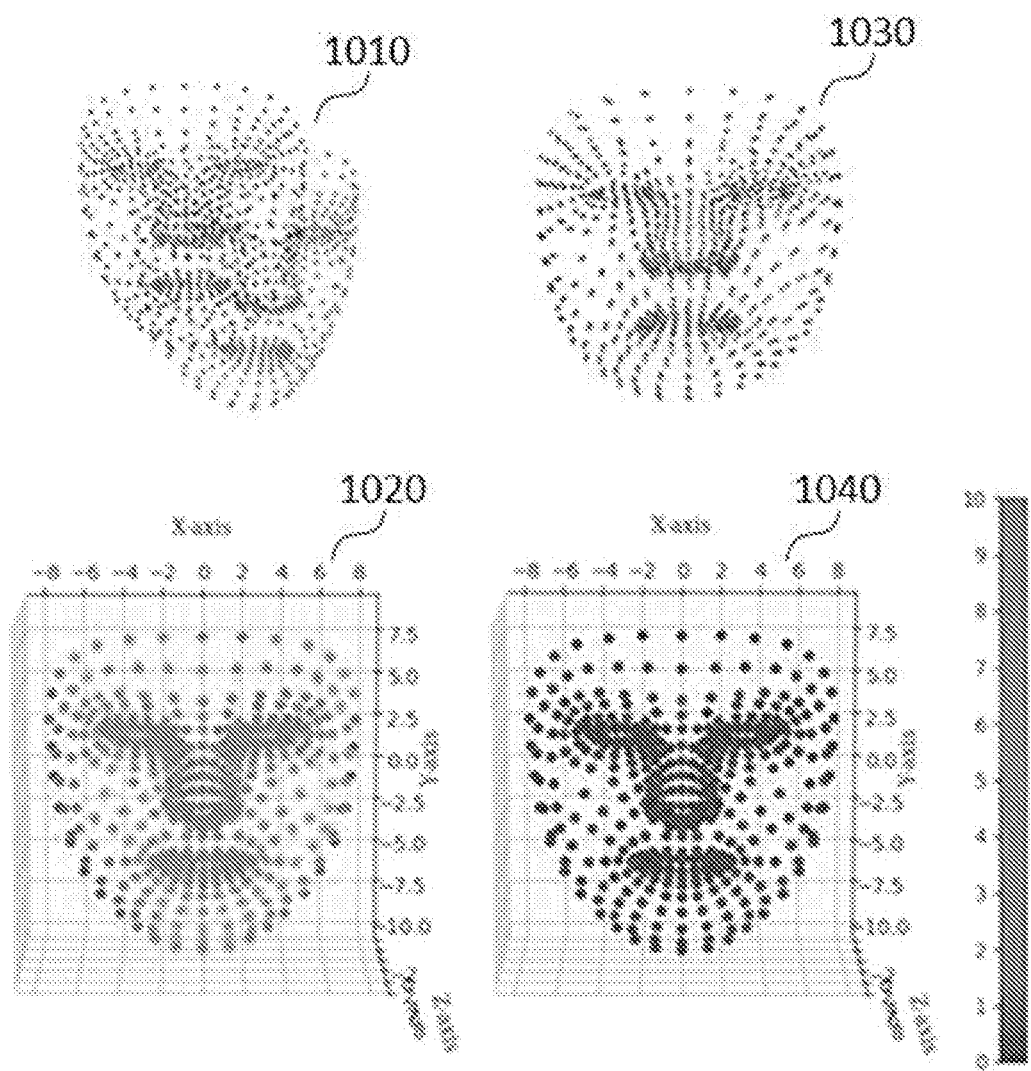
FIG. 10 is a diagram for describing comparison performed using results before and after matching is performed and through visualization according to an embodiment.

In an embodiment, the landmark visualization part may visualize the result of matching the first and second landmarks through the landmark matching part 140 using the heat map. A method of visualizing the first and second landmarks using the heat map is as described above, and as shown in FIG. 10, a comparison of diagrams before and after matching reveals a matching result obtained by a face registration method according to the present invention. Referring to FIG. 10, a diagram 1020 of a result of visualizing first and second landmarks 1010 detected from first and second face image data obtained by photographing the same facial expression at different angles and positions shows that the amounts of movement of landmarks are large, i.e., the amount of movement is displayed in colors similar to red, on the entire face due to the different angles and positions even though the same facial expression of the same person has been photographed, whereas a diagram 1040 of a result of matching first and second landmarks by a face registration method of the present invention (1030) and visualizing the matching result shows that the amounts of movement between the first and second landmarks are generally small, i.e., the amounts of movement are displayed in blue.

By applying the face registration method of the present invention, the amounts of movement on the face represented by first face image data and second face image data can be relatively accurately determined regardless of an angle, position, and size at which the first face image data and the second face image data are captured. Although in FIG. 9, results before and after matching are compared with each other to prove effects of the present invention, when a plurality of pieces of face image data obtained at two specific viewpoints are used, the amounts of movement on the face, i.e., a degree of change in the face, over time can be determined by the face registration method of the present invention, and visualized to represent whether a degree of change in each part of the face is small or large.

As described above, according to the present invention, regardless of an angle, a position and a size at which a plurality of face images are captured, two pieces of face image data can be accurately compared with each other by matching, and a change in the amounts of movement of landmarks of the face image data before or after matching can be visually checked through visualization of the amounts of movement of the landmarks. Therefore, the amount of movement of the muscles of the face of a patient with facial paralysis can be easily identified and used for a mental illness determination system using face recognition.

The operations of the methods or algorithm described above in connection with embodiments of the present invention may be implemented directly by hardware, a software module executed by hardware, or a combination thereof. The software module may be stored in a random access memory (RAM), a read-only memory (ROM), an erasable programmable ROM (EPROM), an electrically erasable programmable ROM (EEPROM), a flash memory, a hard disk, a detachable disk, a CD-ROM, or any type of computer-readable recording medium well known in the technical field to which the present invention pertains. Components of the present invention may be embodied in the form of a program (or an application) and stored in a medium to be executed in combination with a computer which is hardware. The components of the present invention may be implemented by software programming or software elements, and similarly, embodiments may be implemented in a programming or scripting language such as C, C++, Java, or an assembler, including data structures, processes, routines, or various algorithms which are combinations of other programming components. Functional aspects may be embodied as an algorithm executable by one or more processors.

While the embodiments of a face registration apparatus and method according to the present invention have been described above, the present invention is not limited thereto, and various modifications may be made without departing from the scope of the claims, the detailed description, and the appended drawings and should be understood to fall within the scope of the present invention.

What is claimed is:

1. A face registration method performed by a face registration apparatus, comprising:
   (a) obtaining first face image data and second face image data that are captured at different angles, sizes, or locations;
   (b) detecting a first landmark for the first face image data and a second landmark for the second face image data;
   (c) calculating an amount of movement and distance between the first and second landmarks, and setting a plurality of reference landmarks on the basis of the amount of movement and the distance; and
   (d) matching the first and second landmarks with each other by adjusting a position, angle, and size on the basis of the plurality of reference landmarks.

2. The face registration method of claim 1, wherein (b) comprises detecting the first landmark for the first face image data and the second landmark for the second face image data by applying a deep learning algorithm to the first face image data and the second face image data, wherein the deep learning algorithm corresponds to an high-resolution network (HR-net), a convolutional neural network and conditional random field (CNN-CRF), or Mediapipe, and
   the first and second landmarks each comprise a plurality of facial landmarks and a plurality of eye landmarks, wherein the plurality of facial landmarks and the plurality of eye landmarks are managed by assigning a series of numbers thereto, and the same number is assigned to a landmark corresponding to both the first and second landmarks.

3. The face registration method of claim 1, wherein (c) comprises:
   dividing the first and second landmarks into an upper part and a lower part, and dividing the upper part into an upper side, a lower side, a right side, and a left side;
   calculating an amount of movement corresponding to a distance between a pair of corresponding landmarks on the upper part of the first and second landmarks in a three-dimensional (3D) space; and
   selecting a plurality of landmarks from each of the upper, lower, right and left sides of the upper part of the first and second landmarks, starting from a smallest amount of movement.

4. The face registration method of claim 3, wherein (c) comprises:
   calculating a distance between landmarks included on the upper and lower sides of each of the first and second landmarks and a distance between landmarks included on the right and left sides of each of the first and second landmarks among the plurality of landmarks selected from among the first and second landmarks on the basis of the amount of movement; and
   determining a first reference landmark for the first landmark and a second reference landmark for the second landmark by setting, as an upper reference landmark and a lower reference landmark, a pair of landmarks spaced a largest distance from each other among the landmarks included on the upper side and the landmarks included on the lower side and setting, as a right reference landmark and a left reference landmark, a pair of landmarks spaced a largest distance from each other among the landmarks included on the right side and the landmarks included on the left side.

5. The face registration method of claim 4, wherein (d) further comprises:
   moving coordinates of one of the reference landmarks among the first and second reference landmarks to coordinates of an origin; and
   adjusting positions of the first and second landmarks by moving coordinates of the first landmark by an amount of movement of the coordinates of the first reference landmark to the coordinates of the origin and moving coordinates of the second landmark by an amount of movement of the coordinates of the second reference landmark to the coordinates of the origin.

6. The face registration method of claim 5, wherein (d) further comprises:
   generating a first connection line connecting the right and left reference landmarks for each of the first and second reference landmarks, and generating a second connection line by vertically connecting a center of the first connection line and the upper reference landmark;
   calculating an angle between the first and second connection lines and each axis of the 3D space; and
   adjusting angles of the first and second landmarks by rotating the first and second landmarks about each axis on each plane through transformation of Euler angles on the basis of the calculated angle.

7. The face registration method of claim 5, wherein (d) further comprises:
calculating a width and height of each of the first and second reference landmarks corresponding to a distance between the right and left reference landmarks and a distance between the upper and lower reference landmarks for each of the first and second reference landmarks; and
adjusting a size of the second landmark according to a size of the first landmark on the basis of a ratio between the width of the first reference landmark and the width of the second reference landmark and a ratio between the height of the first reference landmark and the height of the second reference landmark.

8. The face registration method of claim 1, further comprising visualizing the first and second landmarks by setting colors thereof using a heat map based on a distance between a pair of corresponding landmarks in the first and second landmarks in a three-dimensional (3D) space before or after the matching of the first and second landmarks.

9. A computer program stored in a non-transitory computer-readable storage medium, wherein, when instructions of the computer program are executed, the method of claim 1 is performed.

10. A face registration apparatus comprising:
an image data obtainer configured to obtain first face image data and second face image data that are captured at different angles, sizes, or locations;
a landmark detector configured to detect a first landmark for the first face image data and a second landmark for the second face image data;
a reference landmark setter configured to calculate an amount of movement and distance between the first and second landmarks and set a plurality of reference landmarks on the basis of the amount of movement and the distance; and
a landmark matching part configured to match the first and second landmarks with each other by adjusting a position, angle, and size on the basis of the plurality of reference landmarks.

* * * * *